United States Patent [19]

Hsieh et al.

[11] Patent Number: 5,424,085
[45] Date of Patent: Jun. 13, 1995

[54] PRODUCING TRANSLUCENT AMORPHOUS SUGAR COATED EDIBLE NUTS AND SEEDS

[75] Inventors: Yen C. Hsieh, Cincinnati, Ohio; Anthony P. Richards, Skokie; Thomas J. Hinkemeyer, Gages, both of Ill.; Benito A. Romanach, West Chester, Ohio

[73] Assignee: The Procter & Gamble Company, Cincinnati, Ohio

[21] Appl. No.: 305,248

[22] Filed: Sep. 13, 1994

Related U.S. Application Data

[63] Continuation-in-part of Ser. No. 973,399, Nov. 10, 1992, Pat. No. 5,243,850.

[51] Int. Cl.$^6$ ............................................. A23L 1/20
[52] U.S. Cl. ........................................ 426/289; 926/93; 926/293; 926/302; 926/306; 926/307; 926/309; 926/629; 926/632
[58] Field of Search ................ 426/93, 98, 99, 103, 426/632, 679, 289, 293, 302, 306, 307, 309

[56] References Cited

U.S. PATENT DOCUMENTS

| | | | |
|---|---|---|---|
| 1,778,537 | 10/1930 | Steely | 426/309 |
| 4,053,650 | 10/1977 | Chino et al. | 426/309 |
| 4,161,545 | 7/1979 | Green et al. | 426/93 |
| 4,499,113 | 2/1985 | Mochizuki et al. | 426/93 |
| 4,501,758 | 2/1985 | Morris | 426/93 |
| 4,522,833 | 6/1985 | Sharma | 426/93 |
| 4,663,175 | 5/1987 | Werner et al. | 426/93 |
| 4,710,228 | 12/1987 | Seaborne et al. | 426/89 |
| 4,910,028 | 3/1990 | Bernacchi et al. | 426/309 |
| 5,061,499 | 10/1991 | Holloway, Jr. et al. | 426/309 |

FOREIGN PATENT DOCUMENTS

| | | | |
|---|---|---|---|
| 1565466 | 5/1990 | U.S.S.R. | 426/632 |

*Primary Examiner*—Anthony J. Weier
*Attorney, Agent, or Firm*—William J. Winter; Brahm J. Corstanje; Rose Ann Dabek

[57] ABSTRACT

Individual coated nuts or seeds are produced by mixing nuts or seeds at 180° F. to 270° F. with coating syrup (including sugar and sweetener syrup) at 270° F. to 330° F., in a rotating pan coater or other shear mixing coater until the coating syrup is distributed over the nuts or seeds, then cooling until the coating syrup begins to set, then adding separating composition, and when individual coated nuts are produced, optionally coating with particulate ingredients and/or a protective alpha-tending emulsifier coating, then transferring from the coater and cooling, then optionally coating with chocolate.

7 Claims, No Drawings

PRODUCING TRANSLUCENT AMORPHOUS SUGAR COATED EDIBLE NUTS AND SEEDS

This is a continuation-in-part of application Ser. No. 07/973,399, filed on Nov. 10, 1992, U.S. Pat. No. 5,243,850.

TECHNICAL FIELD

This invention is directed to a process for coating edible nuts and seeds to produce individual coated nuts or seeds.

1. Background of the Invention

Typically sweetener coated edible nuts are coated prior to roasting. This means that the roasting operation influences the flavor of the coating.

Consideration has been given to developing a process for coating edible nuts or seeds with sweetener, without roasting after coating, so the coating flavor is independent of flavor developed during the roasting operation. Problems that can be encountered in this kind of process are uneven coating, formation of aggregates, a coating with little or no sheen and a requirement for labor intensive operations.

2. Summary of the Invention

The method herein produces individual amorphous sugar containing glaze coated roasted or unroasted nuts or seeds, without roasting after coating, so that coating flavor is independent of flavor generated during any roasting step, and, when present as the outermost coating, provides a translucent sugar containing glaze coating (so that the nut or seed can be discerned) which is uniform and characterized by high sheen, while minimizing the formation of aggregates and labor intensive operation.

The method herein comprises the steps of (a) admixing roasted or unroasted edible nuts or seeds at a temperature ranging from 180° F. to 280° F. and coating syrup at a temperature ranging from 270° F. to 330° F. in a weight ratio of nuts or seeds to coating syrup ranging from 2:1 to 9:1, said coating syrup consisting essentially of sugar and of sweetener syrup in a weight ratio (dry basis) ranging from 1.7:1 to 3.5:1, and from 1 to 5% by weight (on a total coating syrup basis) of water, (b) imparting shear mixing to the admixture of step (a) to distribute the coating syrup over at least a majority of the nuts or seeds, (c) applying cooling gas or other cooling means to the admixture while continuing shear mixing until the coating syrup begins to set, (d) adding separating composition to the admixture obtained in (c) in an amount of 0.01 to 25% by weight (based on the weight of the nuts or seeds) while continuing shear mixing to provide individual nuts coated with solidified coating syrup and separating composition, and (e) cooling the individual coated nuts.

This method is readily carried out on either a batch or a continuous basis.

The term "shear mixing" is used herein to mean mixing such that adjacent nuts travel at different tangential velocities such that smearing and polishing action occurs at nut surfaces.

DETAILED DESCRIPTION OF THE INVENTION

Nuts suitable for use in the method herein are any edible nuts, and include, for example, almonds, Brazil nuts, cashews, filberts, peanuts, pecans, macadamia nuts and walnuts.

Seeds suitable for use in the method herein are any edible seeds, and include, for example, pumpkin seeds and sunflower seeds.

The nuts or seeds can be blanched or unblanched, i.e., with or without skins.

If roasted nuts or seeds are being processed herein, they can be purchased, e.g., in bulk. However, it is preferred to carry out the roasting immediately prior to the processing herein since oxidative instability is enhanced as a result of roasting. The term "roasting" is used herein to mean any heating process which results in desirable flavors due to browning reactions and other complex reactions. Roasting nuts not only has the advantage of generating a desirable flavor in the nuts but also enhances the appearance and texture thereof.

As previously indicated, the temperature of the nuts or seeds for step (a) ranges from 180° F. to 280° F. Preferably, the temperature of the nuts or seeds for step (a) ranges from 190° F. to 250° F.

If unroasted or pre-roasted nuts or seeds are being processed, they can be brought to the appropriate temperature for step (a) by heating in a drum roaster or other heating means, for example, an oven or fluidized bed heating means, for a period just long enough to obtain the required temperature without causing any flavor development, e.g., 2 to 30 minutes, with the particular period depending on the quantity and type of the nuts or seeds and the temperature provided by the heating means.

If roasting is to be carried out as part of the manufacturing operation for the method herein, raw shelled nuts or seeds are first freed of foreign material by gravity separation and/or screening, and then if desired, are blanched. Roasting can then be carried out, for example, in a nut or coffee roaster, e.g., a batch drum roaster, by heating for 10 to 30 minutes at 250° F. to 400° F. and then cooling under ambient conditions, e.g., by removing the heated nuts or seeds from the roaster to a cooling table where they are allowed to cool, or cooling by using mechanical means, e.g., forced air cooling, air conditioning or the like, to a temperature appropriate for step (a). With cooling under ambient conditions, the roast time and/or temperature is desirably reduced compared to conventional nut roasting where nuts are quickly cooled as they exit the roaster to quench flavor development reactions, to prevent over-roasting. Roasting can also be carried out, for example, by removing the nuts from the roaster prior to completion of roasting and allowing the roasting to carry to completion in a hold box where no heat is applied. The roasting is carried out to obtain an internal golden color in nuts.

We turn now to the coating syrup in step (a). As previously indicated, the coating syrup in step (a) consists essentially of sugar and of sweetener syrup in a weight ratio (dry basis) ranging from 1.7:1 to 3.5:1, and from 1 to 5% by weight (on a total coating syrup basis) of water. The sugar ingredient is selected from the group consisting of granulated and powdered, white and brown sugars, and mixtures thereof. The sweetener syrup can be, for example, corn syrup, high fructose corn syrup, deionized corn syrup, honey, maple syrup, imitation maple syrup, high maltose malt syrup, rice syrup, molasses, sorghum syrup and syrups made from sucrose, glucose, fructose and invert sugar. Preferably, the coating syrup in step (a) consists essentially of sugar and of sweetener syrup in a weight ratio (dry basis) ranging from 1.8:1 to 3.0:1, and from 1.5 to 4% by weight (on a total coating syrup basis) of water. The coating syrup can also contain, for example, from 0.1 to 10% by weight (on a total coating syrup basis) of liquid or partially solid triglyceride component (e.g., peanut oil and/or partially hydrogenated soybean oil or cottonseed oil), from 0.1 to 10% by weight (on a total coating syrup basis) of butter or margarine, from 0.1 to 10% by weight (on a total coating syrup basis) of emulsifier (e.g., lecithin), from 0.05 to 8% by weight (on a total coating syrup basis) of flavoring, and from 0.5 to 8% (on a total coating syrup basis) of other carbohydrates such as starch or maltodextrin. Salt (e.g., from 0.1 to 5% on a total coating syrup basis) and bicarbonate of soda (e.g., from 0.2 to 2.0% on a total coating syrup basis) can also be added. The purpose of the salt is to enhance taste. The purpose of the bicarbonate of soda is to increase the volume and surface area of the coating to enhance the coating action as described later.

As previously indicated, the temperature of the coating syrup for step (a) ranges from 270° F. to 330° F. Preferably the temperature of the coating syrup for step (a) ranges from 290° F. to 310° F. Too high a temperature can result in the development of too much browning of reducing sugars which are present because of the inversion of sucrose or in the sweetener syrup components, resulting in burnt or bitter flavors, and can also result in degradation of flavor ingredients and increased hardness in the final coated product. Too low a temperature can result in a sticky or tacky coating which sticks to teeth and gums during eating and poor stability against increase in stickiness and staling, especially on storage under high temperature and relative humidity conditions.

It is preferred to combine the ingredients for the coating syrup and obtain the coating syrup temperature for step (a) in a multi-step process as follows: In a first stage, the sugar and sweetener syrup and water are thoroughly mixed with an agitator in a stainless steel vessel, e.g., a steam kettle, at ambient temperature, and then the mixture is heated to 240° F., e.g., in the steam kettle, and then is heated to 280° F., e.g., by a gas flame, with continuous stirring to avoid hot spots and local overcooking, whereupon flavor, butter or margarine, and triglyceride oil components are added and mixed in with an agitator to obtain a uniform color. Then, in a second stage, this admixture is brought to the selected temperature for the coating syrup for step (a) by continued heating with a gas flame with continuous stirring to avoid hot spots and local overheating. Once the selected temperature is reached, the heating is discontinued and then additional flavor, other carbohydrate, salt, and bicarbonate of soda ingredients are added. The addition of the soda causes the volume of the coating syrup to increase, e.g., to double, and provides foaming action to increase the total surface area of the coating syrup whereby the coating syrup is spread on the nuts more easily and evenly in step (b).

As previously indicated, the weight ratio of nuts or seeds to coating syrup for step (a) ranges from 2:1 to 9:1. Preferably, this ratio ranges from 3:1 to 5:1.

The admixing in step (a) is carried out by any technique that does not cool the coating syrup significantly, i.e., does not cool the coating syrup so that it sets up before being transferred to the nuts or seeds. Preferably, the admixing is carried out by introducing the nuts or seeds into the apparatus for imparting shear mixing in steps (b), (c) and (d), and the coating syrup is poured onto the nuts or seeds therein after it has been brought to the appropriate temperature for step (a). It is preferred to limit rotation or agitation of the shear mixer prior to coating syrup addition, as this damages the nuts or seeds and results in poor appearance. Thus, it is preferred to introduce the coating syrup prior to the start of or concurrent with the start of shear mixing in step (b). Admixing can be aided by stirring the ingredients, e.g., with a paddle or agitator, prior to the beginning of shear mixing.

We turn now to step (b). The shear mixing is readily carried out, for example, in a rotating container coating device such as a revolving pan or drum equipped with ribs or baffles for axial rotation or in a trough mixer (e.g., a modified sigma blade mixer). The apparatus can be suitable for either batch or continuous processing. A suitable device for batch; processing is a revolving pan known in the candy making art as a pan coater. A suitable device for continuous processing comprises a drum preferably equipped with screw flights to control residence time, which is known in the coating art as a coating drum. Rotation in the rotating coating devices is typically carried out at 12 to 35 RPM, preferably at 20 to 30 RPM. Shear mixing in step (b) is preferably carried out to cover the nuts or seeds completely with coating syrup or to form the nut/coating mixture into one mass. This step typically is completed in 30 seconds to two minutes.

We turn now to step (c). As previously indicated, in this step cooling gas or other cooling means is applied to the admixture resulting from step (b) with continued shear mixing until the coating syrup begins to set as indicated by the admixture becoming one mass as it is mixed. This typically occurs in 30 to 90 seconds, often in 45 to 60 seconds. The cooling gas can be, for example, air, nitrogen or carbon dioxide. Preferably the cooling gas is a stream of cool air, e.g., 40° F. to 60° F. air, which can be supplied by a conventional air conditioner. Apparatus for application of the cooling gas can be, for example, a retractable duct that can be directed into the shear mixing apparatus or a stationary duct with an automatic or manual damper, or the shear mixing apparatus can be equipped with valved openings for application of gas therethrough. Preferably, the shear mixing in this step is carried out utilizing the same apparatus operating at the same RPM as in step (b). Alternatively, the admixture from step (b) can be discharged to a different shear mixer equipped for cooling, e.g., containing perforations or other permanent openings. Other cooling means can also be supplied by, for example, introducing dry ice into the shear mixing apparatus.

We turn now to step (d). In this step, separating composition is added to the admixture from step (e) in an amount of 0.01 to 25% by weight (based on the weight of the nuts or seeds) while continuing shear mixing to provide individual nuts coated with solidified coating syrup and separating composition.

The separating composition is preferably one that is liquid during step (d) and comprises edible emulsifier component and/or edible triglyceride component, and is added to the admixture obtained in (c) in an amount ranging from 0.01 to 10% (based on the weight of the nuts or seeds).

Preferably the triglyceride component of the separating composition is a triglyceride oil, i.e., a triglyceride or mixture thereof that is pourable at ambient temperature. Suitable triglyceride oils are, for example, vegetable oils, such as canola oil, cottonseed oil, corn oil, olive oil, peanut oil, rapeseed oil, soybean oil and sunflower seed oil or combinations of these, which may be unhydrogenated or partially hydrogenated. A preferred triglyceride oil is refined, bleached, deodorized peanut oil. Alternatively, a triglyceride component or mixture can be utilized which is solid at ambient temperature but which melts under the processing conditions, i.e., at the temperatures of 170° F. to 210° F. which typically are present in step (d).

The edible emulsifier component of the separating composition can be, for example, mono- and/or diglycerides, derivatives thereof (e.g., acetylated mono- and/or diglycerides, diacetyl tartaric acid esters of mono- and/or diglycerides, succinylated mono- and/or diglycerides, ethoxylated/propoxylated mono- and/or diglycerides, lactylated mono- and/or diglycerides and citric acid esters of mono- and/or diglycerides), lecithin, sorbate esters, sugar esters, polysorbates, polyglycerol esters, propylene glycol esters and combinations of these. Lecithin is preferred.

When triglyceride component is used without emulsifier component, preferably it is used in an amount ranging from 0.05 to 10% (based on the weight of the nuts or seeds), very preferably which is about 0.7% (based on the weight of the nuts or seeds).

When emulsifier component is used without triglyceride component, preferably it is used in an amount ranging from 0.01 to 2% (based on the weight of the nuts or seeds), very preferably which is 0.3% (based on the weight of the nuts or seeds).

Preferably the separating composition comprises triglyceride component and emulsifier component and is used in an amount ranging from 0.05 to 2% (based on the weight of the nuts or seeds), very preferably which is 0.3% (based on the weight of the nuts or seeds). The ratio of triglyceride component to emulsifier component depends on the specific emulsifier used. Often the weight ratio of triglyceride component to emulsifier component is somewhere in the range of 0.1:1 to 10:1. With peanut oil as the triglyceride component and lecithin as the emulsifier component, a preferred weight ratio of peanut oil to lecithin ranges from 2:1 to 6:1 and very preferably is 2:1.

An alternative to utilizing a separating composition which is liquid under the conditions of step (d), is to utilize a particulate solid separating composition, typically in an amount ranging from 5% to 25% (based on the weight of the nuts or seeds). Although particle size is considered not to be critical, typical particle sizes might range from <300 to >6 mesh. Suitable agents that can constitute all or part of a particulate separating composition include, for example, salt, granular sugars (e.g., sucrose, fructose and glucose), edible flow agents (e.g., titanium dioxide), starch, maltodextrin, seasonings, cocoa powder, nut powders/particles, prepared cereals, grains, sesame seeds (whole or ground), brown sugar, egg solids, powdered colorants, dried honey and common dried flavorants such as fruit powders.

The amount of separating composition utilized is sensitive to the kind of nut being treated when a liquid separating composition is used. With more dense nuts, e.g., almonds, peanuts and Brazil nuts, excess separating composition will not become attached to the nuts.

The shear mixing in step (d) is preferably carried out utilizing the same apparatus operating at the same RPM as in steps (b) and (c) and can be supplemented with stirring with a paddle or agitator and clumps can be broken up by hand or with a paddle.

Typically step (d) can be carried out in 1 to 10 minutes.

We turn now to step (e). In this step, the individual coated nuts are cooled from the 170° F. to 210° F. temperatures normally present on completion of step (d) or subsequent optional coating steps, typically to below 120° F., preferably to below 90° F. This is readily carried out by removing the coated nuts from the shear mixing device and transferring them to a cooling table or conveyor where forced air cooling, e.g., from a fan, completes cooling in 4 to 10 minutes, depending upon bed depth.

The individual coated nuts from step (d) and any optional coating step(s) directly after step (d), can be coated with a protective coating of an agent imparting stability against high temperatures (e.g., 90° F. or higher) and/or high relative humidity (i.e., the individual coated nuts are stability coated). This is preferably carried out by coating with alpha-tending emulsifier, such as distilled acetylated monoglyceride of melting temperature ranging from 99° F. to 114° F., propylene glycol esters and lactylated monoglycerides, very preferably by coating with distilled acetylated monoglyceride of melting temperature ranging from 99° F. to 104° F., at a level of 0.5 to 2.0% based on the weight of the nuts or seeds. This is readily carried out by adding the melted alpha-tending emulsifier onto the coated nuts from step (d) or any optional coating step directly after step (d), and continuing shear mixing (e.g., in the same apparatus operating at the same RPM's as in the previous steps) for from 1 to 5 minutes. Other coating agents which can be utilized for this purpose are film forming modified starches (e.g., film forming modified tapioca, potato, rice or corn starches); these require long drying times, e.g., 10 minutes or more.

Particulate ingredients are optionally combined with the individual coated nuts subsequent to step (d) and prior to or subsequent to stability coating and prior to step (e), to produce a particulate coating on top of the translucent sugar containing glaze. For example, topical salt and/or sugar can be added over a period of 10 to 15 seconds with continued shear mixing (e.g., in apparatus with RPM's as described) prior to transfer from the shear mixer to step (e). In one embodiment, particulate edible ingredient, e.g. sugar/spice mixture (e.g., 92 to 96% sugar and 8 to 4% spices) or other particulate edible ingredient, e.g., fine cereals, candy pieces, fruit pieces, or ground nuts or a mixture of these, is coated on the individual coated nuts, e.g., in an amount of 1% to 40% based on the weight of the final product, to cover the translucent sugar containing glaze; this is carried out by adding the particulate edible ingredient onto the coated nuts from step (d) or stability coating thereafter while continuing shear mixing (e.g., in the same apparatus operating at the same RPM's as in previous steps) for from 5 to 15 minutes while heating to maintain the syrup coating on the nuts malleable.

Typically, time in the shear mixer subsequent to step (c) should be minimized as prolonging shear mixing can dull or destroy the shiny coating appearance that is desired. Typically, the total time of the nut in the shear mixing apparatus does not exceed 20 minutes.

If desired, nuts or seeds coated by the process herein can be further coated with from 7 to 60% by weight, normally with 10 to 30% by weight, of chocolate, e.g., dark chocolate, milk chocolate, white chocolate, or flavored chocolate, or of a compound coating (i.e., a confectionery coating which resembles chocolate but doesn't conform to the U.S.D.A. standards of identity for chocolate), and the like, such as carob, by conventional methods. This coating step is carried out, for example, with chocolate on coated nuts or seeds cooled to below 75% F in step (e), by melting the chocolate in a jacketed container, e.g., at 90° F. to 110° F., and spraying the melted chocolate onto the coated nuts or seeds rambling in the shear mixer and then applying cooling air, e.g., 50° F. to 60° F. air, to set the chocolate and continuing this procedure to build up the coating to the selected thickness. Once the chocolate, or the like, coating is firmly set and smooth, it is preferred to apply a polish coat thereon. This is readily carried out utilizing as a coating agent gum arabic, tapioca dextrin, zein or starches, e.g., at a level of 0.5 to 2.0% by weight of the nuts, by pouring aqueous solution of the polish coating agent onto the coated nuts or seeds tumbling in the shear mixer and after a uniform coating is obtained, drying the polish coat by the application of dry air. It is desirable to apply a coating of edible shellac, e.g., either containing wax or dewaxed, as a final coating, e.g., as an alcohol solution, at a level of 0.05 to 0.15% by weight of the nuts; this is readily applied by pouring the shellac composition onto the coated nuts tumbling in the shear mixer whereupon drying occurs since the alcohol evaporates quickly. After the shellac coating has dried, the chocolate and crunch confectionery nuts are ready for packing.

The invention is illustrated by the following examples.

EXAMPLE I

Almonds are roasted to an internal golden color in a nut roaster for 20 minutes at 300° F. The roasted nuts are removed from the roaster to a cooling table and are allowed to cool to 230° F. The nuts are then transferred to a holding chamber where the temperature is maintained at 230° F.

A coating syrup is made up as follows: Sucrose, corn syrup (85 degrees Brix) and water in a ratio of 8 parts to 3.6 parts to 2.5 parts are admixed, and the admixture is heated to 240° F. in a steam jacketed kettle with occasional stirring. A portion of the resulting admixture (an amount containing 800 grams of sucrose) is transferred to a gas kettle and is heated to 280° F. with continuous stirring. Butter (70 g), flavors including toffee flavor (22 grams) and peanut oil (30 grams) are introduced and heating is continued to 300° F. with continuous stirring. When 300° F. is reached, the heat is cut off, and flavors (43 grams), salt (40 grams) and bicarbonate of soda (10 grams) are added with stirring. The volume of the hot coating syrup mixture doubles following the addition of the salt and soda.

The resulting hot coating syrup is immediately poured onto 4700 g of the almonds at 230° F. in a rotating candy type coating pan with fibbing. Rotation of the coating pan at 28 rpm is started after the pouring of the coating syrup thereinto. The rotation of the coating pan is continued until the coating syrup covers the nuts completely, i.e., for about 1 minute.

Once the coating syrup covers the nuts, cooling air at 50° F. is directed toward the admixture via a retractable duct with continued rotation of the pan coater at 28 rpm until the coating syrup begins to set. This occurs in about 45 seconds.

At this point a separating solution made up of peanut oil (10 grams) and lecithin (5 grams) is poured over the syrup coated nut mixture and rotation of the pan coater is continued for 5 minutes while clumps of nuts are broken up with a paddle to produce individual nuts coated with a translucent coating.

Then 47 grams of melted distilled acetylated monoglyceride (mp of 99°–104° F.) is poured onto the individual coated nuts and rotation of the pan coater is continued for 2 minutes to provide a protective acetylated monoglyceride coating thereon.

The coated nuts, at 200° F., are removed from the pan coater to a forced air cooling table and are cooled to ambient in about 7 minutes to produce almonds coated with a shiny translucent sugar-containing layer.

EXAMPLE II

Processing is carried out as in Example I except that one minute after addition of the separating solution, heating is applied to the pan to maintain the syrup coating soft and malleable and 1000 grams of a sugar, dried honey, cinnamon admixture (ratio of sugar to honey to cinnamon of 93 to 3 to 4) is added in 200 gram increments over 8 minutes whereupon the heat is turned off. The result is a sugar/cinnamon coating on translucent glaze coated almonds.

EXAMPLE III

Processing is carried out as in Example I, with cooling of the coated nuts to below 70° F. The cooled coated nuts are transferred to a candy type pan coater without fibbing and are coated with chocolate. This is carried out by melting the chocolate in a jacketed container at 100° F. and spraying the melted chocolate onto the confectionery coated nuts tumbling in the pan coater, and once uniform application is obtained, applying 55° F. air to set the chocolate, and continuing this procedure to provide a chocolate coating of one-fourth inch thickness. Then 0.4 ounces of 25% gum arabic aqueous solution is ladled onto the tumbling chocolate coated nuts, and after uniform application is obtained, dry air is applied to dry the coating while tumbling of the coated nuts continues, to provide a polish coat. This is followed by application of 0.25 ounces of alcohol solution of dewaxed edible shellac (4 lbs. shellac per gallon of alcohol) by pouring said solution on the tumbling nuts. On evaporation of the alcohol, the chocolate and crunch confectionery coated nuts are ready for packing.

EXAMPLE IV

Processing is carried out as in Example I except that honey (80 degrees Brix) is substituted for one-sixth of the corn syrup in an amount maintaining the solids liquid ratio and roasted peanuts at 220° F. are substituted for the almonds. The produced coated nuts are translucent glaze coated peanuts with honey in the glaze.

EXAMPLE V

Processing is carried out as in Example I except that roasted pecans at 220° F. are substituted for the almonds, and the coating syrup is made up starting with sucrose and corn syrup in a weight ratio of 9:5 and includes 90 grams of flavors included instead of 43 grams (including praline flavor instead of toffee flavor) and no butter and 60 grams of peanut oil instead of 30 grams, and 15 grams of salt are added just at the end of the pan coating. The produced coated nuts are translucent praline flavored glaze coated nuts.

EXAMPLE VI

Processing was carried out as in Example I except that 4500 grams of sunflower seeds at 220° F. are substituted for the almonds.

EXAMPLE VII

Processing is carried out as in Example I except that a particulate solid separating composition of 700 grams of peanut powder (on 60 mesh) is substituted for the separating solution.

Many variations of inventive embodiments will be obvious to those skilled in the art. Thus, inventive embodiments are defined by the claims.

What is claimed is:

1. A method for producing edible nuts or seeds which are individually coated in a glazed, translucent, amorphous sugar coating by application of a low-moisture coating syrup, said method comprising the steps of:
   (a) preparing a coating syrup by
      (i) admixing a powdered or granulated sugar and a sweetener syrup in a weight ratio of from 1.7:1 to 3.5:1, and
      (ii) heating the admixture to a temperature of from 270° F. to 330° F., wherein the resulting heated coating syrup contains from 1.5% to 4% by weight of water;
   (b) admixing edible nuts or seeds having a temperature of from 180° F. to 280° F. and the heated coating syrup from step (a) in a weight ratio of from 2:1 to 9:1;
   (c) imparting shear mixing to the admixture of edible nuts or seeds and heated coating syrup to distribute the heated coating syrup on the edible nuts or seeds; then
   (d) applying a cooling gas to the admixture of step (c) while continuing shear mixing until the coating syrup on the edible nuts or seeds begins to set; then
   (e) adding a separating composition to the admixture in step (d) at the point at which the coating syrup begins to set, while also continuing shear mixing, said separating composition being added in an amount of from 0.01% to 25% by weight of the edible nuts or seeds in the admixture, to provide edible nuts or seeds which are individually coated with solidified coating syrup and separating composition; and then
   (f) cooling the admixture of step (e) to produce edible nuts or seeds, which are individually coated in a glazed, translucent, amorphous sugar coating.

2. The process of claim 1 wherein the edible nuts or seeds in step (b) are at a temperature of from 190° F. to 250° F., the coating syrup in step (b) is at a temperature of from 290° F. to 310° F., the weight ratio of edible nuts or seeds to heated coating syrup in step (b) is from 3:1 to 5:1, the weight ratio of powdered or granulated sugar to sweetener syrup in step (a) is from 1.8:1 to 3.0:1, and the coating syrup of step (a) contains from 1.5% to 4% by weight of water.

3. The process of claim 2 wherein the separating composition of step (e) is a liquid selected from the group consisting of an emulsifier, a triglyceride and mixtures thereof, and said liquid separating composition is added to the admixture of step (e) in an amount of from 0.01% to 10% by weight of the edible nuts or seeds.

4. The process of claim 3 wherein subsequent to step (e) and prior to step (f), a particulate edible agent selected from the group consisting of sugar, salt, fine cereals, candy pieces, fruit pieces, ground nuts and mixtures thereof, is coated on the individual coated nuts or seeds by adding said particulate edible agent to the admixture while continuing shear mixing to the admixture and while heating the admixture to maintain the syrup coating on the nuts or seeds as malleable.

5. The process of claim 2 wherein subsequent to step (e) and prior to step (f), a protective coating of alpha-tending emulsifier is applied to the individually coated nuts or seeds.

6. The process of claim 5 wherein the alpha-tending emulsifier is acetylated monoglyceride having a melting point of from 99° F. to 114° F.

7. The process of claim 1 wherein a chocolate or carob coating is applied to the individual coated nuts or seeds subsequent to step (f).

* * * * *

UNITED STATES PATENT AND TRADEMARK OFFICE
CERTIFICATE OF CORRECTION

PATENT NO. : 5,424.085
DATED : June 13, 1995
INVENTOR(S) : Y.C. Hsieh et al

It is certified that error appears in the above-indentified patent and that said Letters Patent is hereby corrected as shown below:

On the title page [63] should read "Continuation-in-part of Serial Number 973,399, November 10, 1992, abandoned."

Signed and Sealed this

Tenth Day of October, 1995

Attest:

BRUCE LEHMAN

*Attesting Officer*  *Commissioner of Patents and Trademarks*